Sept. 20, 1971  F. D. JOESTING  3,605,781
PNEUMATIC RELAY
Filed July 16, 1970
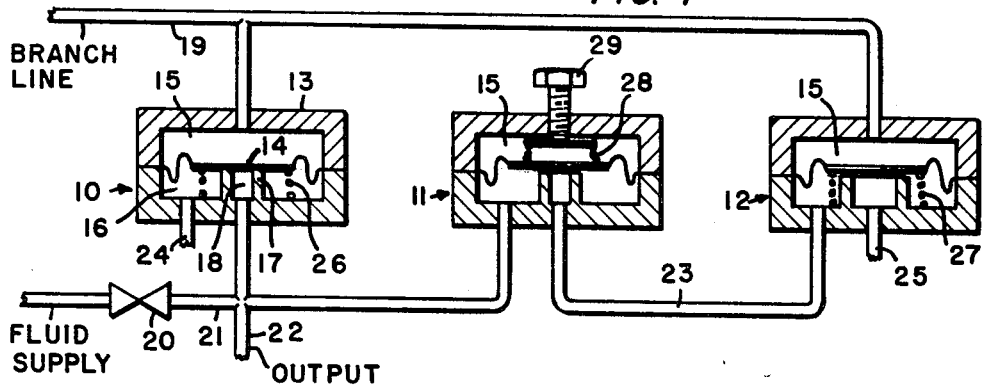
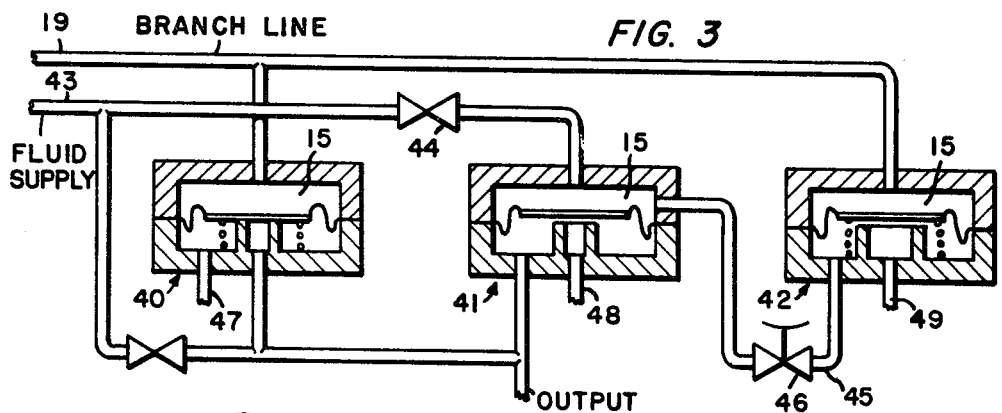
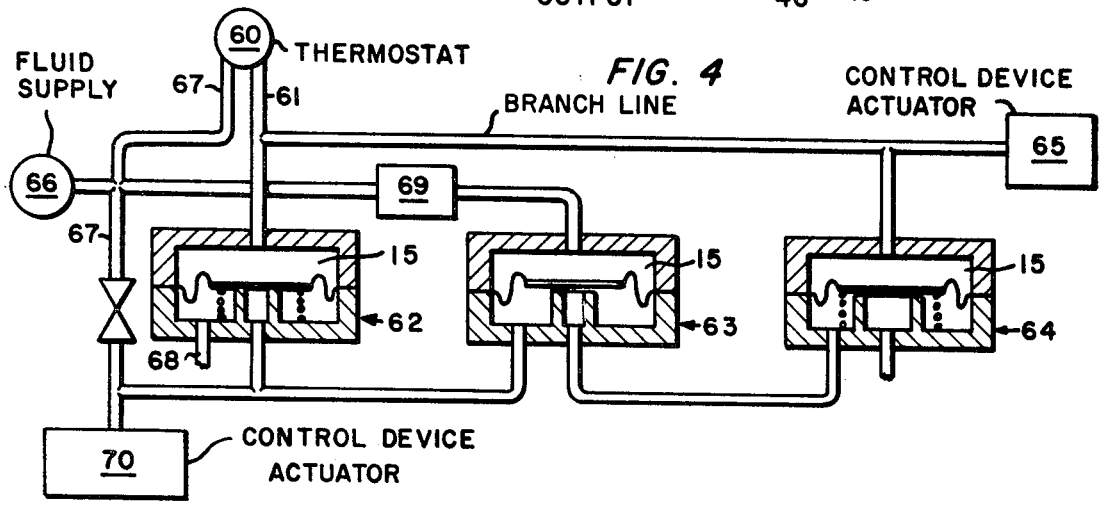
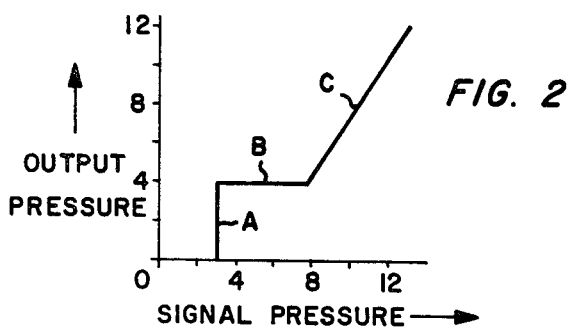
INVENTOR.
FREDERICK D. JOESTING
BY
ATTORNEY.

United States Patent Office 3,605,781
Patented Sept. 20, 1971

3,605,781
PNEUMATIC RELAY
Frederick D. Joesting, Park Ridge, Ill., assignor to
Honeywell Inc., Minneapolis, Minn.
Filed July 16, 1970, Ser. No. 55,320
Int. Cl. G05d 23/00, 11/00
U.S. Cl. 137—82                                    10 Claims

ABSTRACT OF THE DISCLOSURE

A pneumatic relay utilizing diaphragm logic for providing an output pressure to a fresh air damper motor or the like. The damper is held closed until the input pressure to the relay reaches a first level whereupon the damper is opened to a preselected position admitting a preselected percentage of fresh air, which position is maintained until the input pressure reaches a preselected second level, whereafter the damper continues to open as the input pressure continues to increase until 100% fresh air is admitted.

BACKGROUND AND SUMMARY OF THE INVENTION

This invention relates to a pneumatic relay and in particular to a relay adapted to control the position of a damper in a unit ventilator.

In a unit ventilator control circuit, for example ASHRAE Cycle II, the outside air damper is typically closed until the rising space temperature enters the throttling range of the room thermostat. At this point the valve controlling the flow of heating media, which has heretofore been open, begins to close, and the damper is opened to a position to take a fixed minimum percentage of outdoor air. This minimum percentage of outdoor air is maintained throughout the lower half of the throttling range as the valve is being closed. When the temperature begins rising through the upper half of the throttling range, the valve is closed completely and the percentage of outdoor air is gradually increased to one-hundred percent (100%) which corresponds to a fully opened damper. Many schemes have been devised to provide this hesitating action of the damper position. Mueller Pat. No. 3,115,147, filed Feb. 28, 1962, discloses one such scheme for providing this function. The subject invention, however, provides a simpler, more compact and economical method of providing this hesitation function for the damper positioning than known prior art devices.

The subject invention utilizes diaphragm logic to effect this hesitation cycle. Two of three biased diaphragm modules or biased pressure actuated valve means, receive a variable signal pressure from a thermostat or the like. The first biased valve means allows the damper to open to its minimum position when the variable signal pressure reaches a first predetermined level. The second valve means maintains the damper at its minimum position when the variable signal pressure is between the first predetermined level and a second predetermined level. The third valve means allows the damper to open beyond its minimum position when the variable signal pressure increases above the second predetermined level. Adjustment means associated with the second valve means are provided which allows the minimum position of the damper to be selectively varied.

Further advantages of the subject invention will become apparent upon reading of the detailed description of this invention in view of the drawing.

DESCRIPTION OF THE DRAWING

FIG. 1 is a schematic illustration of the preferred embodiment of the pneumatic relay of this invention.

FIG. 2 is a diagram illustrating the relationship between the output pressure to the damper and the variable signal pressure from the thermostat or the like.

FIG. 3 is an alternative embodiment of the subject invention.

FIG. 4 is another alternative embodiment of the subject invention illustrated in a unit ventilator control circuit.

DETAILED DESCRIPTION OF THE INVENTION

The pneumatic relay means of this invention, as shown in FIG. 1, comprises three biased diaphragm modules or biased valve means 10, 11 and 12. Each valve means comprises a housing 13 which housing is divided by a diaphragm 14 into a control chamber 15 and a flow chamber 16. Disposed within the flow chamber 16 is an annular partition or partition means 17 which cooperates with the diaphrgam 14 to define a valving chamber 18.

A variable signal pressure or branch pressure is provided through conduit 19 to the control chambers 15 of valve means 10 and 12. A regulated input pressure or fluid supply is provided by a source not shown to input means including a restriction 20 and a conduit 21 which communicates with the valving chamber 18 of biased valve means 10 and the flow chamber 16 of valve means 11. Output means 22 communicates with the air supply means downstream of the restriction 20. Conduit 23 interconnects the valving chamber 18 of valve means 11 and the flow chamber 16 of valve means 12. The flow chamber of valve means 10 and the valving chamber of valve means 12 exhaust to the atmosphere through exhaust means 24 and 25, respectively.

Disposed within the flow chambers of valve means 10 and 12 are biasing springs 26 and 27. Disposed within the control chamber of valve means 11 is a biasing spring 28. Adjustment means 29 allows the force exerted by spring 28 on the diaphragm to be selectively varied.

In operation when the signal pressure is less than, say, 3 p.s.i., the biasing spring 26 in valve means 10 holds the diaphragm 14 away from the partition means 17 which allows the pressure in conduit 21 to exhaust via exhaust means 24. When the signal pressure increases beyond 3 p.s.i., this pressure in the control chamber 15 of biased valve means 10 causes valve means 10 to close. The output pressure thereupon increases to a level determined by the adjustable spring 28 in valve means 11 which admits the desired minimum percentage of fresh air. This increase is graphically illustrated in FIG. 2 by the portion A of the curve.

The biasing spring 27 in valve means 12 biases the valve means 12 open with a force such that a signal pressure of, say, 8 p.s.i. is required before valve means 12 will tend to close. Accordingly, so long as the signal pressure is less than 8 p.s.i. and, of course, greater than 3 p.s.i., valve means 11 will act as a pressure regulator and will maintain the output pressure at a constant, preselected level. This hesitation is illustrated by the portion B of the curve in FIG. 2.

When the signal pressure increases above 8 p.s.i., biased valve means 12 will tend to close and the pressure in conduit 23 and therefore the output pressure will accordingly increase. The rate of increase of the output pressure with respect to the signal pressure, or in other words the slope of the portion C of the curve shown in FIG. 2, depends on the ratio of the areas over which the branch and supply pressures operate on the diaphragm in valve means 12. If the area of the diaphragm on which supply pressure in the flow chamber may operate is equal to the area of the diaphragm over which the signal pressure in the control chamber may operate, the slope of the curve will be 45°. As the diameter of the annular partition means 17 in valve means 12 increases, the area of the diaphragm over which the supply pressure can operate decreases. Accordingly, the output pressure must increase more for a given increase in the branch pressure in order for the forces on the diaphragm in valve means 12 to balance. Hence the slope of the curve increases. Areas are preferably selected to provide 100% fresh air at a signal pressure corresponding to the top of the thermostat throttling range.

In FIG. 3 an alternative embodiment of the pneumatic relay disclosed in FIG. 1 is illustrated. The operation of this embodiment is essentially the same as the operation of the relay in FIG. 1. However, the adjustable biasing means on the second biased valve means 41 in FIG. 3 is provided by pneumatic pressure as opposed to an adjustable spring means. Connected to a regulated supply of pressure is conduit 43. Pressure is received by the control chamber 15 of valve means 41 through restriction 44. So long as the signal pressure is below a given level, say 8 p.s.i., valve means 42 is biased open by its associated biasing spring and the pressure in the control chamber 15 of valve means 41 is exhausted through exhaust means 49 via adjustable restriction means 46 and conduit 45. Accordingly the pressure in control chamber 15 of valve means 41 is a function of the degree of restriction provided by the adjustable restriction 46. Hence, adjustable restriction 46 establishes the minimum position of the damper or the like just as the adjustable spring 28 in FIG. 1 provided this function.

As the signal pressure increases above 8 p.s.i., means 42 will tend to close. The pressure in control chamber 15 of valve means 41 will accordingly rise. Valve means 41 will hence tend to close and the output pressure will correspondingly tend to rise. Again, the rate of increase of the output pressure with respect to the signal pressure is a function of the diameter of the annular partition means disposed within the flow chamber of valve means 42.

In FIG. 4 a simplified unit ventilator or air-conditioning control circuit is illustrated. Condition responsive means 60, such as a thermostat or humidistat or the like is connected via conduit 67 to a source of regulated pressure 66. The condition responsive means 60 is further connected via conduit 61 to the first and third biased valve means 62 and 64. Also connected to the thermostat via conduit 61 is control means or control means actuator 65. This control means may be a valve actuator, or in an electric heat installation, control means 65 may represent a step controller. Control means 65 is used for controlling the flow of means to effect a change in the condition to which the condition responsive means is responsive. This means may be hot water, steam, or in the case of electric heat it may be electrical current.

The pneumatic relay means in FIG. 4 utilizes an adjustable pressure reducing valve or the like 69 to establish a selected pressure in the control chamber 15 of valve means 63. This adjustable pneumatic bias replaces the adjustable spring bias in FIG. 1. In all the other respects the pneumatic relay in FIG. 4 operates in the same fashion as the relay means in FIG. 1.

Connected to the output of the pneumatic relay means in FIG. 4 is a second control means 70. Typically this control means is a damper motor. However, it again may be any control means capable of controlling the flow of some means to effect a change in the condition to which the condition responsive means is responsive.

If it is assumed that the condition that is being controlled is the temperature of the air in a space, so that the condition responsive means 60 represents a thermostat, the control means 65 represents an actuator for a valve controlling the flow of, say, hot water, and the control means 70 represents the damper motor, the system disclosed in FIG. 4 operates as follows. If the temperature of the space is below the throttling range of the thermostat 60, the signal pressure in conduit 61 will typically be less than 3 p.s.i. Valve means 65 will be open since a valve in this type of installation is a normally open valve. The output pressure to damper means 70 will be zero since valve means 62 will be biased open and will be exhausting the pressure input to that valve means via exhaust means 68.

As the temperature in the space rises due to the hot water flowing through a heat exchanger not shown, the temperature of the space will enter the throttling range of the thermostat. This point is represented by a signal pressure of say 3 p.s.i. At this point biased valve means 62 will close and the damper motor 70 will cause the damper to open to a minimum position. As the temperature in the space continues to rise valve means 65 will begin to close so that at the mid-point of the throttling range, say at 8 p.s.i. signal pressure, the valve means 65 will be completely closed. At this point damper motor 70 would be at the end of its hesitation due to the closing action of valve means 64 and, upon a further increase in branch pressure, the damper will begin to open further from its minimum position. When the temperature of the space reaches the upper end of the throttling range of the thermostat, which point is represented by a pressure of say 13 p.s.i., the valve means 65 of course will be closed and at this point the damper means 70 will be fully opened. As the temperature in the space falls from this point, a reverse sequence of events occurs.

While the subject invention has been described in the context of temperature controls and unit ventilators, it should be understood that this invention may be equally well utilized in many applications. Accordingly it is intended that the scope of the invention be limited only by the scope of the appended claims.

The embodiments of the invention in which an exclusive property or right is claimed are defined as follows:

1. Pneumatic relay means comprising:
   control chamber means for connection with a variable signal pressure;
   fluid supply means including restriction means;
   output means communicating with said supply means downstream of said restriction means for providing an output signal;
   first biased valve means connecting said output means to exhaust means whereby the output pressure is zero until said variable signal pressure reaches a first predetermined level, whereupon the output pressure increases to a predetermined value;
   second biased valve means for maintaining said output signal constant at said predetermined value when said variable signal pressure is between said first predetermined level and a second predetermined level; and
   third biased valve means for allowing said output signal to increase above said predetermined value when said variable signal pressure increases above said second predetermined level.

2. A pneumatic relay according to claim 1 additionally comprising means to adjustably bias said second biased valve means whereby the predetermined value at which the output signal is maintained when said variable signal pressure is between said first and second predetermined levels may be adjustably varied.

3. A pneumatic relay according to claim 2 wherein said first and third biased valve means are biased by spring means.

4. A pneumatic relay according to claim 3 wherein said second biased valve means is adjustably biased by adjustable spring means.

5. A pneumatic relay according to claim 3 wherein said second biased valve means is adjustably biased by a selectively variable pneumatic pressure.

6. A pneumatic relay according to claim 1 wherein said first, second and third biased valve means each comprises:
   housing means;
   diaphragm means dividing said housing means into a control chamber and a flow chamber; and,
   partition means disposed within said flow chamber and arranged to cooperate in sealable relation with said diaphragm means to further define a valving chamber.

7. A pneumatic relay according to claim 6 wherein said control chamber means comprises the control chambers of said first and third biased valve means and is in communication with said variable signal pressure and the valving chamber of said first biased valve means and the flow chamber of said second biased valve means are in communication with said fluid supply means.

8. A pneumatic relay according to claim 7 wherein the valving chamber of the second biased valve means is in communication with the flow chamber of the third biased valve means, the flow chamber of the first biased valve means and the valving chamber of the third biased valve means are in communication with exhaust means, the flow chambers of the first and third bias valve means have spring means disposed therein biasing said biased valve means open, and the control chamber of said second biased valve means has adjustable spring means disposed therein to bias said second biased valve means closed.

9. A pneumatic relay according to claim 7 additionally comprising:
conduit means including variable restriction means interconnecting the control chamber of said second biased valve means in the flow chamber of said third biased valve means;
spring means disposed within the flow chambers of said first and third biased valve means and biasing said first and third biased valve means open;
exhaust means in communication with the flow chamber of said first biased valve means and the valving chambers of said second and third biased valve means; and
conduit means including restriction means connecting the control chamber of said second biased valve means to a source of regulated pressure.

10. A pneumatic relay as defined in claim 1 in combination with:
condition responsive means for providing said variable signal pressure;
first control means connected to said condition responsive means for controlling the flow of first means to effect a change in the condition to which the condition responsive means is responsive; and,
second control means connected to the output means of said pneumatic relay for controlling the flow of second means to effect a change in the condition to which the condition responsive means is responsive.

References Cited

UNITED STATES PATENTS 3,115,147   12/1963   Mueller _____ 137—116.5

ALAN COHAN, Primary Examiner

U.S. Cl. X.R.

137—115, 119; 236—82, 79